UNITED STATES PATENT OFFICE.

J. W. HJERPE, OF STOCKHOLM, SWEDEN.

IMPROVEMENT IN THE MANUFACTURE OF FRICTION-MATCHES.

Specification forming part of Letters Patent No. 40,259, dated October 13, 1863.

*To all whom it may concern:*

Be it known that I, J. W. HJERPE, of Stockholm, in the county of Stockholm and Kingdom of Sweden, have invented a new and useful Improvement in the Manufacture of Friction-Matches; and I do hereby declare that the following is a full, clear, and exact description thereof.

Prior to my invention serious inconveniences were inevitably attached to the manufacture as well as to the use of friction-matches. Employés in the manufacture of phosphorus get affected with horrible and deadly diseases; and how many grevious accidents, as life destroyed by the poison of the match compound, or fire by matches being inflamed by accidental friction, have not been reported. The importance of remedying this evil is generally felt, and has induced me to exertions which have become successful.

In the progress of my experiments I discovered two compounds of different nature whose contact by the aid of friction produces inflaming. Applying one of these compounds to matches, I call it "match compound," and applying the other to separate surfaces, forming the rubbers, I call it "rubber compound." Matches fabricated by this method I call "safety-matches with rubber."

Neither my match compound nor my rubber compound contains phosphorus. Neither is poisonous or dangerous.

The match compound gets inflamed by friction on the rubber, but by no other friction. The friction of match compound on match compound does not set fire. This circumstance will prevent fire by accidental friction.

The rubber compound is not inflammable by any friction. It sets fire only to the match compound, without burning itself.

The employment of iron bases in my match compound causes a distinguished advantage and superiority.

By introduction of my invention into general use the dangerous manufacture of bones into phosphorus for matches would cease, and the bones could benefit agriculture, for which they produce a most excellent manure.

Having thus pointed out what distinguishes my said invention from all other compounds before known for producing friction-matches, I will now describe my ingredients and my mode of mixing and preparing.

1. *Ingredients for my match compound.*—Chlorate of potassa, $KOClO_5$; chromate of potassa, $KOCrO_3$; or bichromate of potassa, $KO2CrO_3$; sesquioxide of iron, $Fe_2O_3$; or specular iron, $Fe_2O_3$; or colcothar or calcined protosulphate of iron (red oxide of iron, caput mortuum,) or manganese, $Mn$; or binoxide of lead $PbO_2$; glue or gum, or any other glutinous or gelatine substance; pounded glass, or such like substance, if desired, to increase friction.

Good proportions of above ingredients: first, four to six parts chlorate of potassa, two parts bichromate of potassa, two parts sesquioxide of iron, or colcothar or specular iron, three parts glue; second, four to six parts chlorate of potassa, two parts bichromate of potassa, two parts manganese or binoxide of lead, three parts glue; third, which I prefer, four pounds chlorate of potassa, four pounds chromate of potassa, two pounds specular iron or colcothar, two pounds gum; total, twelve pounds, which is enough for the preparation of one million two hundred thousand matches.

2. *Ingredients for my rubber compound.*—Sulphuret; chromate of potassa, $KOCrO_3$; or bichromate of potassa, $KO2CrO_3$; oxide or binoxide or colcothar, sulphate of iron, glue or gum, or any other cement, pounded glass, or substances of equivalent properties, if desired, to increase friction.

Good proportions of just-named ingredients: first, twenty parts sulphuret of antimony, $SbS_3$; two to four parts bichromate of potassa, $KO2CrO_3$; four to six parts caput mortuum vitrioli or colcothar or any oxide of iron, lead, or other metal, or binoxide; two to three parts glue or any gelatine or glutinous substance; second, which I prefer, twenty pounds sulphuret of antimony, two pounds chromate of potassa, six pounds red iron oxide or colcothar, three pounds protosulphate of iron, $FeOTO_3$, three pounds gum; total, thirty-four pounds, enough for the preparation of rubbers for thirty-four thousand boxes, each box of one hundred matches. Serves also for three million four hundred thousand matches.

The mixing of either of the above compounds can be done with or without the application of heat. I prefer for it a temperature of about $60°$ Fahrenheit.

My usual method for mixing my match compound is: I convert the gelatine or glutinous ingredients with a little water by a gentle heat in a smooth jelly, and put it into a cold or warm porcelain mortar to liquefy. I rub the chlorate down through this gluten, then the chromate, and last the oxide, till the whole forms a uniform paste. If pounded glass is employed, it is added the very last.

My usual method for mixing my rubber compound is similar to the above stated. Having converted the gelatine or glutinous ingredients in a liquid, I add the chromate, then the oxide, then the sulphate, at last the sulphuret.

It is well to remind that the grinding of chlorate of potassa should be done in a separate and clean utensil. If any particles of sulphur or sulphurets get mixed or pounded with it, an explosion can result.

Although the ingredients of my two different compounds, if mixed and ground together in a dry state, would produce an explosion, yet I can mix these two compounds after being separately worked into the pasty state, as above described, and matches prepared with this compounded compound require no extra prepared friction-surface; no rubber. They light by any friction, but are, like phosphorous matches, liable to inflame by accidental friction. I prefer the matches prepared for a special rubber.

My compounds for safety-matches with rubber are not affected by common heat. They do not diffuse an odor, either during the fabrication or afterward. The articles furnished with it can endure moisture, as well as common heat.

The act of lighting or burning my match compound produces neither smoke nor dangerous gas nor poisonous product; all sulphurets by which poisonous effects are produced, are excluded from this compound. If the match-stick is not prepared with stearine, wax, or such like substance, sulphur is used to imbibe the ends before applying my compound, and then the odor of common sulphur matches is adherent.

The rubber does not inflame by lighting the match, therefore the sulphurets or sulphates in its compound produce no smoke nor gas. Its surface keeps up usefulness admirably well, and can, if required, be cleaned by simply wetting with a drop of water by a rub of a finger, and after being dried its good quality is restored. Friction-surfaces prepared for phosphorous matches get quickly wasted by use. This might have induced to reject a special friction-surface.

The rubber may be attached to any convenient object, and may be manufactured in various forms. To suit pocket-etwees or pocket-books, the most convenient shape will be in sheets.

The operation of lighting my safety-match is to strike it with a quick rub over the rubber. As my safety-matches do not inflame by otherwise rubbing, they are much more safe in the hands of children. Although I prefer the safety-matches with the special-prepared rubber as being in my judgment the best adapted to give all the advantages of my invention, nevertheless I do not wish to be understood as limiting my claim of invention to this method alone, as the mixture of my two different compounds into one will produce a new and useful compound, as and for the purpose set forth. Neither do I exclude substances having equivalent properties to those which exist in chlorate of potassa, chromate of potassa, and sulphuret of antimony. The substantial propriety of my ingredients is inflaming by the aid of friction, and this property is not in the bases. The bases of my ingredients are, although not the substantial parts, nevertheless preferable to all other substances; also, a variation from the stated proportions might give good results and suffer only in the degree of excellence. Although oxides are employed in the manufacture of phosphorous matches, yet I claim the employment of oxides of iron as new and preferable to any other oxide for the application to match compound.

Having thus fully described my invention, what I claim, and desire to secure by Letters Patent of the United States, is—

1. The application of certain ingredients, substantially such as herein specified, for the purpose to obviate the employment of phosphorous or other dangerous substances in the preparation of friction-matches.

2. The method of preparing friction-matches as to require a special-prepared rubber, substantially as herein described.

J. W. HJERPE. [L. S.]

Witnesses:
JOHN SANDBLAD,
A. W. SUNDSTEDT.